3,464,845
ANTIFRICTION BEARINGS

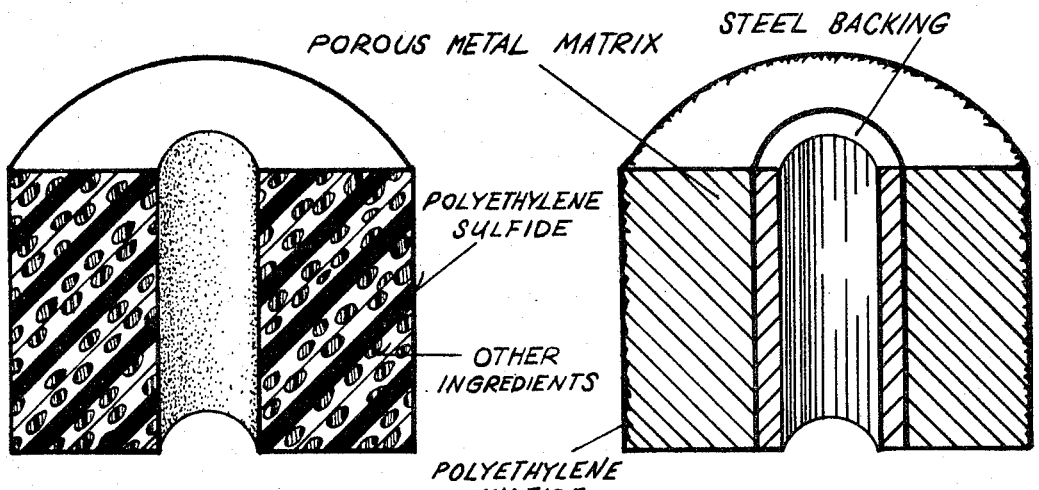
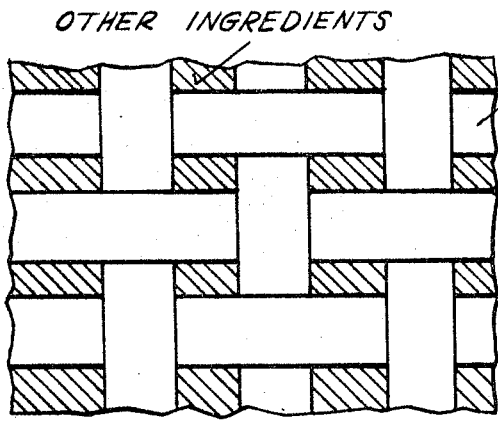
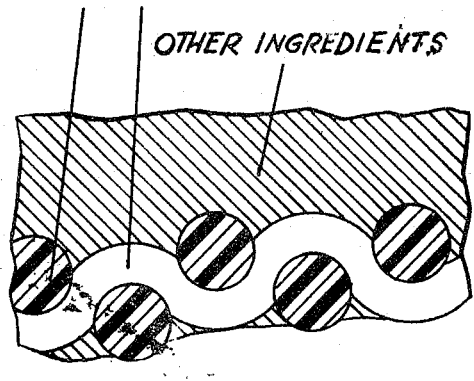

Stephen W. Osborn, Yardley, and Riad H. Gobran, Levittown, Pa., assignors to Thiokol Chemical Corporation, Bristol, Pa., a corporation of Delaware
Filed Sept. 14, 1965, Ser. No. 487,130
Int. Cl. B44d 1/34; F16c 33/20
U.S. Cl. 117—49                                    13 Claims

ABSTRACT OF THE DISCLOSURE

An antifriction bearing is provided in which the composition of at least those portions and surfaces of a bearing subject to wear contains from about 40% to about 90% by volume of a polyethylene sulfide resin having a melting point of between 200° C. and 215° C. and a melt index at 215° C. below about 1.5 grams per minute admixed with at least one other solid bearing composition ingredient, preferably polytetrafluoroethylene. Other usual bearing composition ingredients may also be present in the composition.

---

This invention relates to antifriction bearings and, more particularly, to a new and improved bearing and method of manufacturing the same. More particularly the invention is directed to a method of making a bearing which has a long lasting antifriction bearing surface thereon which surface consists of high molecular weight polyethylene sulfide resin and one or more other solid substances.

It is, therefore, an object of the present invention to provide a bearing and a method of making the same wherein a polyethylene sulfide bearing surface is provided which has long lasting characteristics and good chemical and solvent resistance.

It is another object of the present invention to improve the properties of high molecular weight polyethylene sulfide as a bearing surface by incorporating therein one or more other solid substances.

Further objects and advantages will be apparent from the invention herein described.

In seeking for desirable materials for bearing applications the problem is complicated by the fact that not one or two, but a variety of properties are necessary in a good bearing material. Different applications require that the bearing possess different properties; however, a set of properties which is especially desired for bearings is: low coefficient of friction even when unlubricated, high resistance to abrasion and low wear rate, low creep, chemical and solvent resistance, and good heat stability up to relatively high temperatures. The compositions of the present invention are especially desirable in bearing applications which require this particular combination of properties.

The bearings of the present invention are especially suited for such purposes as end bearings in car engines, since these bearings require a high degree of chemical and solvent resistance as well as the other above mentioned properties which are also necessary for this application.

The term "antifriction bearing" used herein is to be understood as including any member or assembly having or designed to have in use at least one surface which bears directly, or through a liquid or solid lubricant, against the surface of another member relative to which the antifriction bearing has sliding movement, irrespective of whether the main or sole purpose of the antifriction bearing is to transmit a load from one to the other of the surfaces having relative sliding movement or whether the sliding contact is solely or partly for some other purpose, such as to provide a seal. The term "antifriction bearing" as used herein, therefore, thus includes not only a member whose main or sole purpose is to transmit a load through a surface thereon to a surface of another member relative to which the first surface has sliding movement when in operation but it also includes such members which are commonly referred to as piston rings, pistons, cylinders, sliding or rotary fluid seals, and the cages of ball or roller bearings.

In an antifriction bearing according to the present invention at least a layer adjacent to the bearing surface, that is to say the surface which constitutes or is to become the bearing surface, consists of a mixture of polyethylene sulfide resin, as defined below, and one or more other solid substances.

For the purpose of the present invention polyethylene sulfide resin is a solid high molecular weight, moldable, crystalline polymer such as is disclosed in the R. H. Gobran and S. W. Osborn copending U.S. patent application Ser. No. 274,866, filed Apr. 22, 1965 now abandoned, and of which U.S. 3,365,431 is a continuation-in-part. This polyethylene sulfide polymer has a melting point of between 200° C. and 215° C. and a melt index at 215° C. below about 1.5 grams per minute according to the test described in the above patent application. The proportion of the other solid substance or substances (hereinafter called for convenience the "other ingredients") may vary considerably but should be between about 10% and about 60% by volume of the composition constituting the layer adjacent to the bearing surface.

Examples of the other ingredients with which the polyethylene sulfide resin may be admixed to form the bearing composition according to the invention are sintered or unsintered polytetrafluoroethylene (hereinafter called P.T.F.E.) in granular or fibrous form, metals such as lead and metal alloys such as bronze, materials which exhibit the property of ready cleavage such as graphite, molybdenum disulphide, lead di-iodide, and boron nitride, and certain inert filler materials such as kieselguhr, cupric oxide, asbestos fibre or glass fibre.

Bearings may be made according to the present invention by admixing the polyethylene sulfide resin with the other ingredient(s), and then forming the bearings from such admixture by moulding, extrusion, compacting and curing or similar known processes. Alternately the antifriction bearing may be made by first heating the polyethylene sulfide above its softening point until the polyethylene sulfide becomes a liquid. The other materials may then be added to the liquid polyethylene sulfide. The admixture is then placed in the desired mold and cooled to form a solid bearing surface.

Another embodiment of the present invention comprises polyethylenesulfide fibers woven into a fabric which is then impregnated with one or more other ingredients which may be in granular or fibrous form and then adapted to use as an antifriction bearing as described herein. Also within the scope of the present invention is the use of one or more other ingredients such as P.T.F.E., in the form of a fiber, which is woven into a fabric which is then impregnated with polyethylene sulfide which can be used as bearing or bodies of material for the manufacture of bearings. "Impregnation" as used herein refers to the mode of attachment of the backing material or impregnate to the cloth or fabric and is such that the backing material partially or completely penetrates the small interstices between the fibers of the cloth or fabric so that the backing material and the cloth or fabric become a unitary structure. An additional embodiment of the present invention comprises polyethylenesulfide fibers woven together with fibers of the other ingredients to produce a fabric which is then impregnated with polyethylenesulfide and/or the other ingredients in granular or fibrous form which can be used as bearings or bodies of materials for the manufacture of bearings. FIGURES 3a and 3b exemplify this embodiment wherein a polyethylene sulfide fabric is impregnated with other ingredients.

An antifriction bearing, according to the present invention may be of unitary form, as exemplified in FIGURE 1, wherein the bearing may comprise simply a body of the admixture of polyethylene sulfide resin and other ingredients. The bearing may also be of composite form, as exemplified in FIGURE 2, wherein the bearing may comprise two or more layers bonded to one another with one of such layers constituting or incorporating the bearing material according to the invention while the other layer or layers constitute a support or backing or otherwise provide additional strength.

One form of composite bearing according to the invention comprises a metal backing, for example, of steel, brass, aluminum alloy, having a layer of the admixture of polyethylene sulfide resin and other ingredient or ingredients bonded to its surface and in this case the admixture may be applied to the backing in strip form or in the form of powder or granules and subsequently bonded to the backing by heating the composite structure above the softening point of the resin while simultaneously pressing the admixture on to the surface of the metal backing, e.g. between the rolls of a rolling mill. Moreover the admixture of polyethylene sulfide resin and other ingredient(s) is applied as a layer to a metal backing in this way to form a bearing. The backing may be treated before such application to provide a rough, or pitted surface so as to assist the bonding between the mixture and the metal backing. For example, the metal backing may be treated by shot blasting to provide a rough surface or it may be chemically treated, as for example, in the case of a steel backing, by phosphating, or in the case of an aluminum or aluminum alloy backing, by anodizing.

Another form of composite bearing according to the present invention comprises a porous metal body or matrix in which the pores of at least the surface layer, which is to constitute a bearing surface, contain polyethylene sulfide resin either alone or admixed with one or more other ingredients.

In this case the porous metal matrix may be in the form of a layer forming part of a composite bearing which is bonded to a steel or other metal backing. In cases where the pores of the porous metal matrix contain polyethylene sulfide resin alone without other ingredients, the resin incorporated in the pores of the metal matrix and the metal of the matrix, itself, together form a substantially homogeneous mixture including polyethylene sulfide resin at the bearing surface. FIGURE 2 illustrates a composite bearing having a porous metal matrix impregnated with polyethylene sulfide.

When the polyethylene sulfide resin or admixture of polyethylene sulfide resin and one or more other ingredients is incorporated in a porous metal matrix, e.g. in the form of a layer itself bonded to a steel or other metal backing, to form a composite bearing or bearing material, the incorporation may be effected by the application of heat and/or pressure to a layer or strip of the polyethylene sulfide resin or admixture of polyethylene sulfide and other ingredients laid or spread on the surface of the matrix, and will preferably be such as to leave over the bearing surface of the matrix a thin surface layer of the resin or admixture.

The following examples are merely illustrative of the present invention and are not intended as a limitation upon the scope thereof.

Example 1

A bearing in the form of a disc is made by injection moulding, at a temperature of about 216° C. and at a pressure of about 10,000 pounds per square inch, a substantially homogeneous admixture consisting of approximately 80% by volume of granular polyethylene sulfide resin and approximately 20% by volume of granular P.T.F.E. A bearing is also made, as outlined above, except that fibrous P.T.F.E. is used in place of the granular P.T.F.E.

Example 2

A bi-metal strip consisting of a steel backing to which is applied and bonded a porous bronze layer, has applied to the surface of the bronze layer by hot-pressing at a temperature of 220° C. a layer of material comprising a substantially homogeneous mixture consisting of approximately 80% by volume of polyethylene sulfide resin and approximately 20% by volume of P.T.F.E. in the form of powder.

The composite strip thus formed is then cut into thrust washers or into blanks from which bearings of other types may be made in known manner.

Example 3

A high molecular weight polyethylene sulfide resin is extruded into fibers. These fibers are then woven into fibers. The fibers are then woven into a fabric. A layer of a substantially homogeneous mixture of approximately 60% by volume of polyethylene sulfide resin, approximately 35% of granular P.T.F.E., and approximately 5% graphite is then applied to the surface of the polyethylene sulfide fabric by hot-pressing at a temperature of 220° C.

We claim:
1. An antifriction bearing in which at least the outer layer of the bearing surface comprises a body formed of a substantially homogeneous admixture consisting essentially of high molecular weight polyethylene sulfide resin having a melting point of between 200° C. and 215° C. and a melt index at 215° C. below about 1.5 grams per minute in quantities of from about 40% to about 90% by volume of the mixture and at least one other solid substance selected from the group of bearing composition ingredients consisting of polytetrafluoroethylene, metals, metal alloys, graphite, molybdenum disulfide, lead di-iodide and boron nitride.

2. An antifriction bearing as in claim 1 further characterized in that a bonding portion of the body is incorporated in a porous metal matrix, said metal being a backing metal.

3. An antifriction bearing as in claim 2 wherein said metal backing is formed of a metal or alloy of a metal selected from the group consisting of steel, brass, aluminum and aluminum alloy.

4. An antifriction bearing as in claim 1 further characterized in that said body is bonded to at least one surface of a backing metal.

5. An antifriction composite bearing as in claim 4 wherein said metal backing is formed of a metal or alloy of a metal selected from the group consisting of steel, brass, aluminum and aluminum alloy.

6. An antifriction bearing as in claim 1 wherein said other solid substance is polytetrafluoroethylene.

7. An antifriction bearing as in claim 1 wherein said other solid substance is a finely divided bearing metal.

8. An antifriction bearing as in claim 7 wherein said finely divided metal is lead.

9. An antifriction bearing as in claim 7 wherein said finely divided metal is a metal alloy.

10. An antifriction bearing as in claim 1 wherein said other solid substance is material having ready cleavage properties and selected from the group consisting of graphite, molybdenum disulfide, lead di-iodide and boron nitride.

11. An antifriction bearing in which at least the outer layer of the bearing surface comprises a body formed of a woven fabric consisting essentially of fibers of polyethylene sulfide resin having a melting point of between 200° C. and 215° C. and a melt index at 215° C. below about 1.5 grams per minute impregnated with at least one other solid substance selected from the group of bearing composition ingredients consisting of polytetrafluoroethylene, metals, metal alloys, graphite, molybdenum disulfide, lead di-iodide, boron nitride, or an admixture of at least one of said ingredients with about 10 to about 90% by volume of said polyethylene sulfide resin.

12. A method of making a composite antifriction bearing which comprises treating a metal backing to provide a rough and pitted surface, applying to the pitted surface an admixture consisting essentially of polyethylene sulfide resin having a melting point of between 200° C. and 215° C. and a melt index at 215° C. below about 1.5 grams per minute in quantities of from about 10% to about 90% by volume of the total admixture, and comprising at least one other solid bearing composition ingredient selected from the group consisting of polytetrafluoroethylene, metals, metal alloys, graphite, molybdenum disulfide, lead di-iodide and boron nitride, by impregnating the admixture in the pitted surface, heating the treated backing to a temperature of at least about 220° C.

13. A method as in claim 12 wherein said other solid substance is polytetrafluoroethylene.

References Cited

UNITED STATES PATENTS 3,365,431  1/1968  Gobran et al. _____ 260—79.7

RALPH S. KENDALL, Primary Examiner

U.S. Cl. X.R.

117—132, 161; 156—153; 161—189, 217; 260—41, 79.7; 308—238